United States Patent [19]

Maruyama et al.

[11] 4,177,777

[45] Dec. 11, 1979

[54] EXHAUST GAS RECIRCULATION CONTROL SYSTEM

[75] Inventors: Kimiomi Maruyama, Yokohama; Yoshitaka Hata, Fujisawa; Akihiro Ohnishi, Koshigaya, all of Japan

[73] Assignee: Nissan Motor Company, Limited, Japan

[21] Appl. No.: 824,316

[22] Filed: Aug. 12, 1977

[30] Foreign Application Priority Data

Aug. 23, 1976 [JP] Japan ................ 51-100435

[51] Int. Cl.$^2$ ........................................... F02M 25/06
[52] U.S. Cl. ............................................. 123/119 A
[58] Field of Search ................................ 123/119 A

[56] References Cited

U.S. PATENT DOCUMENTS

| | | | |
|---|---|---|---|
| 2,493,587 | 1/1950 | Lee | 123/119 A |
| 2,521,244 | 9/1950 | Moore, Jr. | 123/119 A |
| 3,807,376 | 4/1974 | Glockler et al. | 123/119 A |
| 3,820,514 | 9/1974 | Kuehl | 123/119 A |
| 3,868,934 | 3/1975 | Mick | 123/119 A |
| 3,921,611 | 11/1975 | Walker | 123/119 A |
| 3,981,284 | 9/1976 | Gospodar | 123/119 A |
| 4,018,198 | 4/1977 | Williams | 123/119 A |
| 4,075,992 | 2/1978 | Linder et al. | 123/119 A |

*Primary Examiner*—Wendell E. Burns
*Attorney, Agent, or Firm*—Robert E. Burns; Emmanuel J. Lobato; Bruce L. Adams

[57] ABSTRACT

An exhaust gas recirculation (EGR) control system for an internal combustion engine, in which an EGR control valve including a vacuum-operated actuator governs the flow of recirculated exhaust gas according to the admission of air into the engine. To accomplish the control with high precision, the control system includes a flow sensor which provides an electrical signal representing the volume flow rate of air in the induction passage and a control circuit for controlling the magnitude of vacuum for the EGR valve through the operation of an electromagnetic valve based on the signal from the flow sensor. Optionally the control system has another flow sensor which provides an electrical signal representing the volume flow rate of recirculated exhaust gas to the control circuit to accomplish a feedback control.

5 Claims, 2 Drawing Figures

EXHAUST GAS RECIRCULATION CONTROL SYSTEM

BACKGROUND OF THE INVENTION

This invention relates to an improved system for controlling the recirculation of exhaust gas through an internal combustion engine.

Concerning the prevention of air pollution by exhaust gas of internal combustion engines, probably a most widely employed technique for suppressing NOx emission is the recirculation of a portion of exhaust gas back into the engine intake. The recirculation of exhaust gas (EGR) has the effect of lowering the maximum combustion temperature in the engine combustion chambers so that the formation of NOx in the combustion chambers can be suppressed.

The suppressive effect of EGR on the formation of NOx is enhanced as the volume of the recirculated exhaust gas relative to the volume of fresh air admitted into the engine is increased (this volume ratio will hereinafter be referred to as EGR rate). To maintain NOx emission below a permissible level, there is a need of effecting EGR at considerably high EGR rates. On the other hand, the employment of high EGR rates tend to cause instability of the engine operation. Accordingly the EGR rate must be controlled in dependence on the engine operating condition and high precision is required of the control especially when high EGR rates are involved in the scope of the control.

In conventional EGR control systems, it is a usual way of operating an EGR control valve to employ a vacuum-operated actuator which is connected to the induction passage of the engine, so that the EGR control valve is operated in dependence on the magnitude of vacuum either at a venturi section of the induction passage or at a section near a throttle valve. Such vacuum is of course an indication of the volume flow rate of air in the induction passage, but there is a limitation to the precision in the control of EGR when the actuator (hence the control valve) is directly operated by, for example, the venturi section vacuum. Furthermore, it is inevitable that a considerable fluctuation occurs in the EGR rate upon variation of the engine operating condition, causing instability of the engine operation and/or increase in the emission of NOx.

SUMMARY OF THE INVENTION

It is an object of the present invention to provide an EGR control system for internal combustion engines, which control system is superior to conventional EGR control systems in the precision of the control.

It is another object of the invention to provide an improved EGR control system for internal combustion engines, which control system employs electrical signals for operating an EGR control valve to accomplish a precise control even when changes occur in the engine operating condition.

According to the invention, an EGR control system comprises, in addition to a conventional flow control valve, a flow sensing means for sensing the volume flow rate of air in the induction passage of the engine and producing an electrical signal representing the sensed flow rate. For example, an aeroflow-meter of a potentiometer type serves as the flow sensor. The system further comprises an electromagnetic device as part of an actuator for operating the control valve and a control circuit which supplies an electrical signal to the electromagnetic device based on the signal from the flow sensor. Accordingly the volume flow rate of the recirculated exhaust gas can be regulated in direct and predetermined relation to the volume flow rate of air in the induction passage. This means the possibility of controlling the EGR rate with an improved precision.

To further improve the precision of the control, the control system may have another flow sensing means for sensing the volume flow rate of exhaust gas in the recirculation passage at a section upstream of the control valve. In this case, the control circuit is made to include a comparison circuit in order that the signal for the operation of the electromagnetic device represents a deviation of a realized EGE rate from an intended EGR rate. Then the control system accomplishes a feedback control: the flow rate of the recirculated exhaust gas is minutely regulated until the aforementioned deviation is cancelled.

When the control system employs a commonly used valve actuator which is operated by intake vacuum, an electromagnetic valve is associated with a vacuum transmission passage for the actuator to control the magnitude of vacuum applied to the actuator by the admission of an adequate quantity of air into this passage in response to the output of the control circuit.

DESCRIPTION OF PREFERRED EMBODIMENTS

Figure 1:
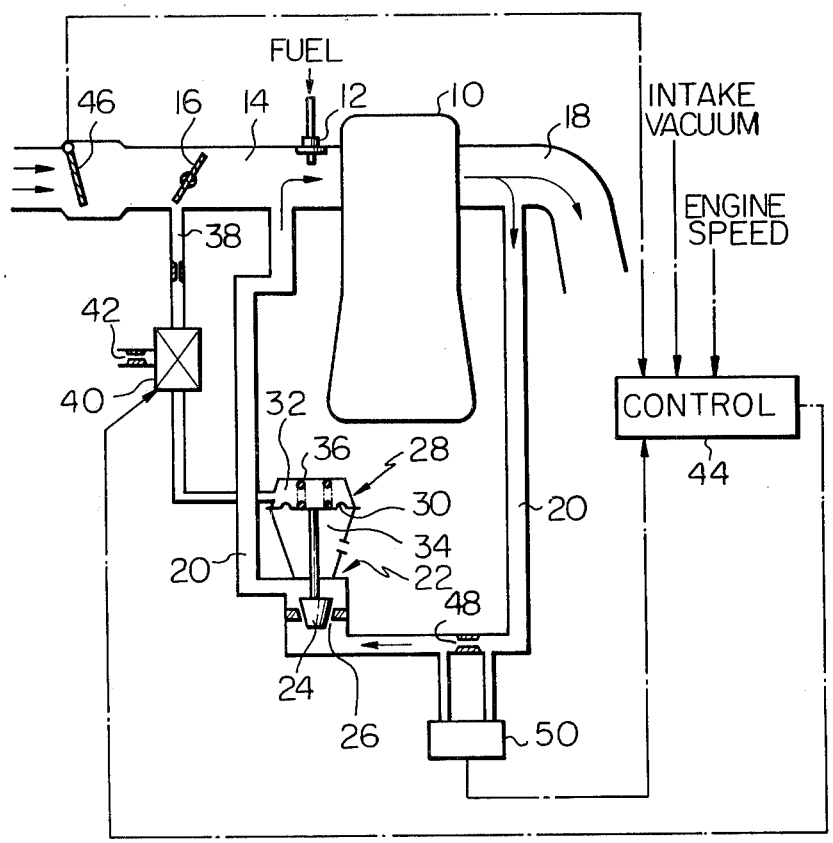
FIG. 1 is a diagrammatic presentation of an exhaust gas recirculation control system according to the invention, applied to an internal combustion engine equipped with a fuel injection system.

In FIG. 1, reference numeral 10 indicates an internal combustion engine. A fuel system for this engine 10 has a fuel injector 12 opening into an induction passage 14 at a section downstream of a throttle valve 16. An exhaust gas recirculation (EGR) passage 20 branches from an exhaust passage 18 to interconnect it to the induction passage 14 downstream of the throttle valve 16 for the purpose of recirculating a portion of the exhaust gas to the combustion chambers of the engine 10. A conventional EGR control valve 22 is associated with the EGR passage 20 to control the volume flow rate of the exhaust gas through this passage 20. In the illustrated case, the control valve has a tapered valve member 24 which is axially movable in an orifice 26 formed in the passage 20. A valve actuator 28 for moving this valve member 24 has a diaphragm 30 which holds the stem of the valve member 24 and serves as a partition between a vacuum chamber (working chamber) 32 and an atmospheric pressure chamber 34. A spring 36 is installed in the vacuum chamber 32 to bias the diaphragm 30 towards the atmospheric pressure chamber 34. An intake vacuum produced by the engine 10 is applied to the vacuum chamber 32 through a duct 38, and the valve member 24 is arranged such that an effective cross-sectional area of the orifice 26 increases as the magnitude of vacuum applied to the chamber 32 increases.

According to the invention, an electromagnetic valve 40 is associated with the vacuum transmission duct 38 to admit a variable quantity of air into this duct 38 through an air admission passage 42 and is operated by the output of an electronic control circuit 44. To provide an input signal representing the volume flow rate of air admitted into the induction passage 14, an aeroflow-meter 46 of, for example, a potentiometer type which produces an electrical signal is disposed in the induction passage 14 at a section upstream of the throttle valve 16. The control system may optionally include additional transducers for utilizing other variables relating to the operating condition of the engine 10, for example engine speed, intake vacuum, engine temperature and/or atmospheric pressure, also as inputs to the control circuit 44. The output of the control circuit 44 varies generally such that the electromagnetic valve 40 allows the admission of an increased quantity of air into the vacuum duct 38 as the quantity (volume flow rate) of air admitted into the induction passage 14 decreases.

Preferably, an orifice 48 is provided in the EGR passage 20 at a section upstream of the control valve 22, and a differential pressure sensor 50 which produces an electrical signal representing a pressure difference between the upstream and downstream sides of this orifice 48. The output of this sensor 50 is put into the control circuit 44. In this case, the control circuit 44 includes a comparison circuit to detect any deviation of an actual exhaust gas flow rate at the orifice 48 represented by the output of the sensor 50 from an intended flow rate represented by a control signal established in the circuit 44 as the basis for the power signal to be supplied to the electromagnetic valve 40 and has a corrective function of regulating the power signal to eliminate the deviation.

There will be no need of explaining the particulars of the control circuit 44 since analoguous electronic control circuits are well known in respect of feedback control of air-to-fuel ratio in intake systems for internal combustion engines.

The operation of the EGR control system of FIG. 1 will have already been grasped. If a realized EGR rate, that is, the volumetric ratio of the actually recirculated exhaust gas (represented by the output of the differential pressure sensor 50) to the actually admitted air (detected by the aeroflow-meter 46), is above an intended EGR rate, the control circuit 44 provides a power signal to the electromagnetic valve 40 to allow admission of a sufficient quantity of air into the vacuum duct 38 thereby to decrease the magnitude of vacuum applied to the actuator 28. Then the diaphragm 30 deflects towards the atmospheric chamber 34 with the result that the valve member 24 changes its position to decrease an effective opening area of the orifice 26. Consequently a decrease occurs in the volume of the recirculated exhaust gas. The power signal continues to fluctuate until the realization of an intended EGR rate. When a realized EGR rate is below an intended EGR rate, the valve member 24 is moved to increase an effective opening area of the orifice 26 by diminishing or interrupting the admission of air into the vacuum duct 38 through the electromagnetic valve 40.

When some variables relating to the operating condition of the engine 10 (other than the quantities of the admitted air and recirculated exhaust gas) are put into the control circuit 44 in the form of electrical signals as mentioned hereinbefore, the output of the control circuit 44 is modified in dependence on these variables. For example, the EGR rate may somewhat be lowered while the engine 10 is operated under a high speed low load condition. Furthermore, the EGR rate may be minutely corrected according to a fluctuation in the air-to-fuel ratio of the combustible gas mixture fed to the engine 10 caused by variations in the induction passage temperature and/or atmospheric pressure.

Figure 2:
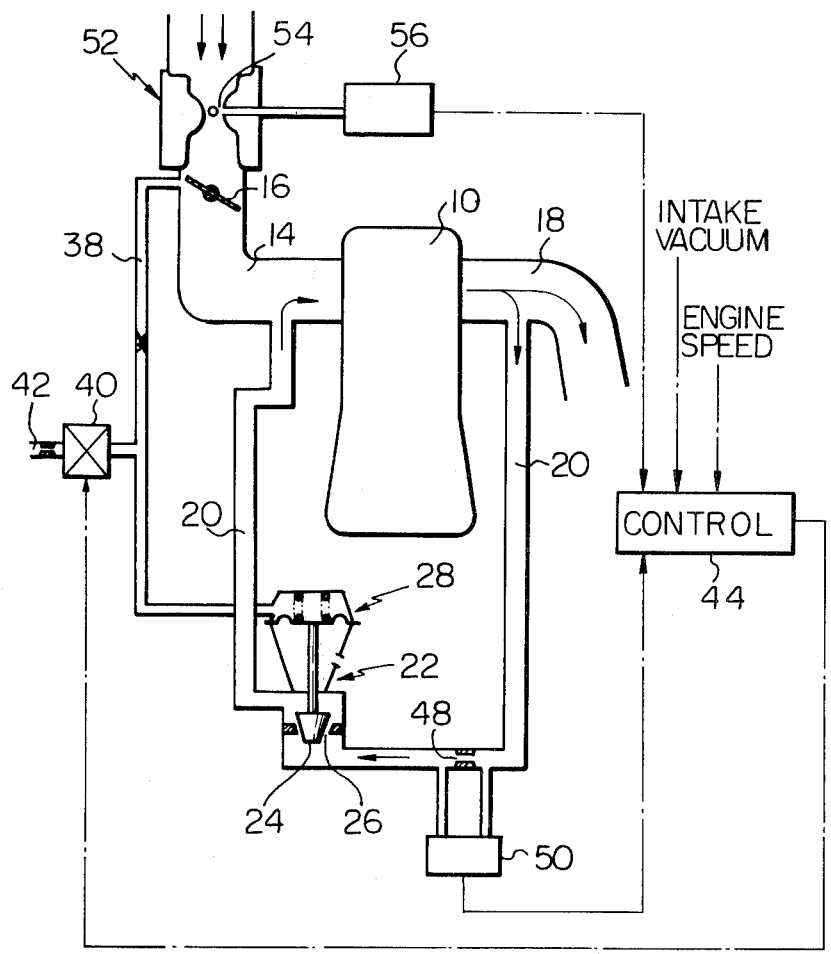
FIG. 2 shows a modification of the control system of FIG. 1 in the case of the engine being equipped with a carburetor.

When the engine 10 is equipped with a carburetor 52 as shown in FIG. 2 instead of the fuel injection system in FIG. 1, the EGR control system of FIG. 1 is modified only in the following respect. In place of the aeroflow-meter 46 in FIG. 1, a vacuum sensor 56 of, for example, a potentiometer type is attached to the carburetor 52 to measure the magnitude of vacuum at the venturi section 54 of the carburetor 52 as an accurate indication of the volume flow rate of air admitted into the engine 10. The output of the vacuum sensor 56 is used as a primary input to the control circuit 44.

Alternatively to the aeroflow-meter 46 of a potentiometer type, a different type of flow sensor such as an instrument based on Karman's vortex may be employed. Still alternatively, the volume flow rate of air in the induction passage 14 may be converted to an electrical signal by electrically detecting the engine speed and either the opening degree of the throttle valve 16 or the intake vacuum.

When the above described EGR control system performs a feedback control by the use of an exhaust flow sensor such as the differential pressure sensor 50, any fluctuation in the EGR rate can surely be converged to an intended value. The quantity of the recirculated exhaust gas is regulated in quick response to variations in the quantity of air admitted into the engine 10, so that hardly occurs a significant deviation of the EGR rate from an intended rate even when changes occur in the engine operating condition. The engine 10, therefore, can always operate smoothly with the maintenance of a satisfactorily low level of NOx emission. The feedback control method, featuring very small control errors, is particularly suitable for EGR systems designed to effect a heavy EGR.

As mentioned hereinbefore, it is permissible to construct an EGR control system of the invention so as to perform a programmed control, meaning the omission of the sensor 50 for detecting the flow rate of the recirculated exhaust gas. In this case, the control circuit 44 includes a function generator to produce a power signal which is principally in dependence on the input signal representing the volume flow rate of air in the induction passage 14, so that the admission of air into the vacuum duct 38 and hence the opening area of the control valve 22 are regulated in predetermined relation to the quantity of air admitted into the engine 10. The power signal may be modified based on relating variables such as engine speed, engine temperature and/or intake vacuum which also are converted to electrical signals and put into the control circuit 44 as mentioned hereinbefore. For example, the control circuit 44 may be so designed as to lower the EGR rate when the engine is not sufficiently warmed up and when NOx emission is not a matter of great concern as in the case of a motor vehicle cruising in rural or suburban territories.

The above described programmed control can be accomplished by the use of less expensive system components than the precedently described feedback control, but the programmed control is somewhat inferior to the feedback control in precision. Accordingly the programmed control is suitable for engine systems in which EGR is effected at relatively low EGR rates.

Even in the case of a programmed control method, a control system according to the invention can control the EGR rate with remarkably improved precision compared with conventional EGR control systems in which the quantity of air admitted into the engine is not directly measured.

In any case, it is preferable to control the EGR rate in such a pattern that the EGR rate is maximized only in a medium speed medium load range of the engine operating condition (the engine is most frequently operated in this range, and a relatively high level of NOx emission tends to occur in this range) in order to effectively accomplish the object of suppressing NOx emission and maintain an average fuel consumption on a satisfactory low level.

What is claimed is:

1. A system for controlling the flow of exhaust gas recirculated from an exhaust passage of an internal combustion engine to an induction passage of the engine through an exhaust recirculation passage, the system comprising:
   a flow control valve to vary an effective cross-sectional area of the exhaust recirculation passage;
   a first flow sensing means for sensing the volume flow rate of air in the induction passage and producing a first electrical signal representing the sensed flow rate;
   a second flow sensing means for sensing the volume flow rate of exhaust gas in the recirculation passage and producing a second electrical signal representing the sensed flow rate;
   a control means for producing a third electrical signal representing a deviation of the ratio of the volume flow rate of exhaust gas represented by said second electrical signal to the volume flow rate of air represented by said first electrical signal from a preset ratio; and
   an actuator means for operating said control valve in response to said third electrical signal.

2. A system as claimed in claim 1, wherein said second flow sensing means comprise an orifice provided in the recirculation passage at a section upstream of said control valve and a differential pressure sensor arranged to sense a pressure difference between the upstream and downstream sides of said orifice.

3. A system as claimed in claim 2, wherein said first flow sensing means comprise an aeroflow-meter of a potentiometer type.

4. A system as claimed in claim 2, wherein the engine is equipped with a carburetor, said first flow sensing means comprising a vacuum sensor of a potentiometer type arranged to sense the magnitude of vacuum at a venturi section of said carburetor.

5. A system for controlling the flow of exhaust gas from an exhaust passage of an internal combustion engine to an induction passage of the engine through an exhaust recirculation passage, the system comprising:
   a flow control valve to vary an effective cross-sectional area of the exhaust recirculation passage;
   a vacuum-operated actuator for operating said control valve connected to the induction passage by a vacuum transmission passage such that said effective cross-sectional area increases as the magnitude of vacuum applied to said actuator increases;
   a first flow sensor means for sensing the volume flow rate of air in the induction passage and producing a first electrical signal representing the sensed flow rate;
   a second flow sensor means for sensing the volume flow rate of exhaust gas in the recirculation passage and producing a second electrical signal representing the sensed flow rate;
   an electromagnetic valve arranged to admit a variable quantity of air into said vacuum transmission passage;
   a control circuit for supplying a third electrical signal to said electromagnetic valve based on said first and second electrical signals, said third electrical signal representing a deviation of the ratio of the volume flow rate of exhaust gas represented by said second electrical signal to the volume flow rate of air represented by said first electrical signal from a preset ratio, so that said magnitude of vacuum is varied to regulate said effective cross-sectional area until said deviation is cancelled.

* * * * *